(12) United States Patent
Bouru

(10) Patent No.: US 7,530,758 B2
(45) Date of Patent: May 12, 2009

(54) MECHANICAL DEVICE COMPRISING A PLURALITY OF PARTS ASSEMBLED TOGETHER WITH ACCURATE RELATIVE POSITIONING

(75) Inventor: Michel Andre Bouru, Montereau sur le Jard (FR)

(73) Assignee: SNECMA, Paris (FR)

( * ) Notice: Subject to any disclaimer, the term of this patent is extended or adjusted under 35 U.S.C. 154(b) by 27 days.

(21) Appl. No.: 11/294,460

(22) Filed: Dec. 6, 2005

(65) Prior Publication Data

US 2006/0133894 A1    Jun. 22, 2006

(30) Foreign Application Priority Data

Dec. 16, 2004  (FR) .................................. 04 13388

(51) Int. Cl.
B25G 3/00       (2006.01)
E21B 17/043   (2006.01)
F16D 1/00       (2006.01)

(52) U.S. Cl. ....................... 403/286; 403/293; 403/302; 403/310; 248/222.11

(58) Field of Classification Search ................. 403/293, 403/302, 286, 310–314; 248/222.11, 222.12
See application file for complete search history.

(56) References Cited

U.S. PATENT DOCUMENTS

| 2,136,370 | A | * | 11/1938 | Bockius et al. ............. 156/184 |
|---|---|---|---|---|
| 2,354,919 | A | * | 8/1944 | Lockwood ................. 248/68.1 |
| 2,609,723 | A | * | 9/1952 | Stubbs ........................ 411/340 |
| 2,963,539 | A | * | 12/1960 | Hynes ...................... 174/138 J |
| 3,643,518 | A | * | 2/1972 | Semin et al. ................. 474/139 |
| 3,823,443 | A | * | 7/1974 | Takabayashi ................. 24/186 |
| 4,297,820 | A | * | 11/1981 | Artzer ...................... 52/309.11 |
| 4,597,690 | A | * | 7/1986 | Girard ........................ 403/391 |
| 4,853,268 | A | * | 8/1989 | Hansen ...................... 428/42.3 |
| 4,872,242 | A | * | 10/1989 | Allan ........................ 24/16 PB |
| 4,897,900 | A | * | 2/1990 | Baggett ........................ 24/543 |
| 5,538,606 | A | * | 7/1996 | Hishida ................... 204/228.4 |
| 5,715,643 | A |   | 2/1998 | Parkinson |
| 5,941,483 | A | * | 8/1999 | Baginski .................... 248/68.1 |
| 5,979,095 | A | * | 11/1999 | Schneider et al. ............. 40/633 |
| 6,260,836 | B1 | * | 7/2001 | Aoyama et al. ............. 267/221 |
| 6,985,759 | B2 | * | 1/2006 | Ona ......................... 455/575.3 |

FOREIGN PATENT DOCUMENTS

| EP | 0 263 587 | 4/1988 |
|---|---|---|
| FR | 2 373 311 | 7/1978 |

\* cited by examiner

*Primary Examiner*—Daniel P Stodola
*Assistant Examiner*—Nahid Amiri
(74) *Attorney, Agent, or Firm*—Oblon, Spivak, McClelland, Maier & Neustadt, P.C.

(57) ABSTRACT

Assembling a plurality of parts together in a manner that enables a device of complex shape to be reconstituted. At least one of the parts includes two ribs in a chevron configuration and at least one other part includes two grooves in a chevron configuration, the ribs and the grooves being complementary in shape and of corresponding dimensions.

14 Claims, 2 Drawing Sheets

MECHANICAL DEVICE COMPRISING A PLURALITY OF PARTS ASSEMBLED TOGETHER WITH ACCURATE RELATIVE POSITIONING

The invention relates to any mechanical device that comprises an assembly of a plurality of parts that are fastened relative to one another and that require said parts to be positioned relative to one another accurately so as to constitute a mechanical assembly of complex shape that would be difficult to make as a single part by molding and/or machining. The invention enables the assembled-together parts to be positioned immediately and completely accurately in a manner that can be repeated with the same ease, accuracy, and reliability if ever the parts need to be disassembled and then reassembled.

BACKGROUND OF THE INVENTION

In order to assemble two parts together in accurate and repeatable manner, several solutions are already known that require the addition of ancillary components. For example, it is possible to use conical pins. The housings for such pins need to be made in a single operation while the two parts are accurately assembled together by specific mechanical means, thus requiring an assembly jig that is more or less complex depending on the nature of the parts to be assembled together. Once that operation has been achieved, the conical pins make it possible on each assembly operation to ensure that the two assembled-together parts return to a position that is accurately identical.

Conical holes can weaken the parts for assembling together, particularly if the parts are of small dimensions. Furthermore, conical pins can be lost during assembly and reassembly operations.

Another solution consists in indexing by means of cylindrical pegs that are engaged by force into one of the parts for assembling together, and that are received as a snug fit in corresponding bores in the other part.

The risks of weakening remain, and the machining and fitting operations remain relatively complex. Furthermore, the quality with which the two parts are positioned relative to each other depends on the fitting clearance with which the peg is engaged in the bore that receives it.

Under all circumstances, it is extremely difficult to "share" an assembly of complex shape and relatively small dimensions between a certain number of simpler parts that are positioned relative to one another, because of the numerous holes that need to be drilled.

OBJECTS AND SUMMARY OF THE INVENTION

The invention enables those problems to be solved. The idea on which the invention is based consists in forming (machining) the positioning means in the parts themselves in such a manner as to eliminate the use of any separate fittings for positioning purposes.

More precisely, the invention provides a mechanical device comprising an assembly of a plurality of parts that are fastened to one another and that need to be accurately positioned relative to one another, wherein at least one of the parts includes two ribs in a chevron configuration, and wherein at least one other part includes two grooves in a chevron configuration, the ribs and the grooves being of complementary shapes and of corresponding dimensions, said parts becoming positioned one relative to another on assembly by mutual engagement of said ribs and grooves of chevron configuration.

Advantageously, said ribs and grooves are of V-section.

The ribs and the grooves can be machined with very high precision by implementing modern numerically controlled machine tools. They can also be obtained by using traditional equipment that is simpler, providing the ribs and the grooves on the two parts for assembling together are made in a single series of machining operations (milling) applied to both parts simultaneously while installed on the machine tool and without the parts being separated therefrom.

BRIEF DESCRIPTION OF THE DRAWINGS

The invention can be better understood and other advantages thereof appear more clearly in the light of the following description given purely by way of example and made with reference to the accompanying drawings, in which.

MORE DETAILED DESCRIPTION

Figure 1:
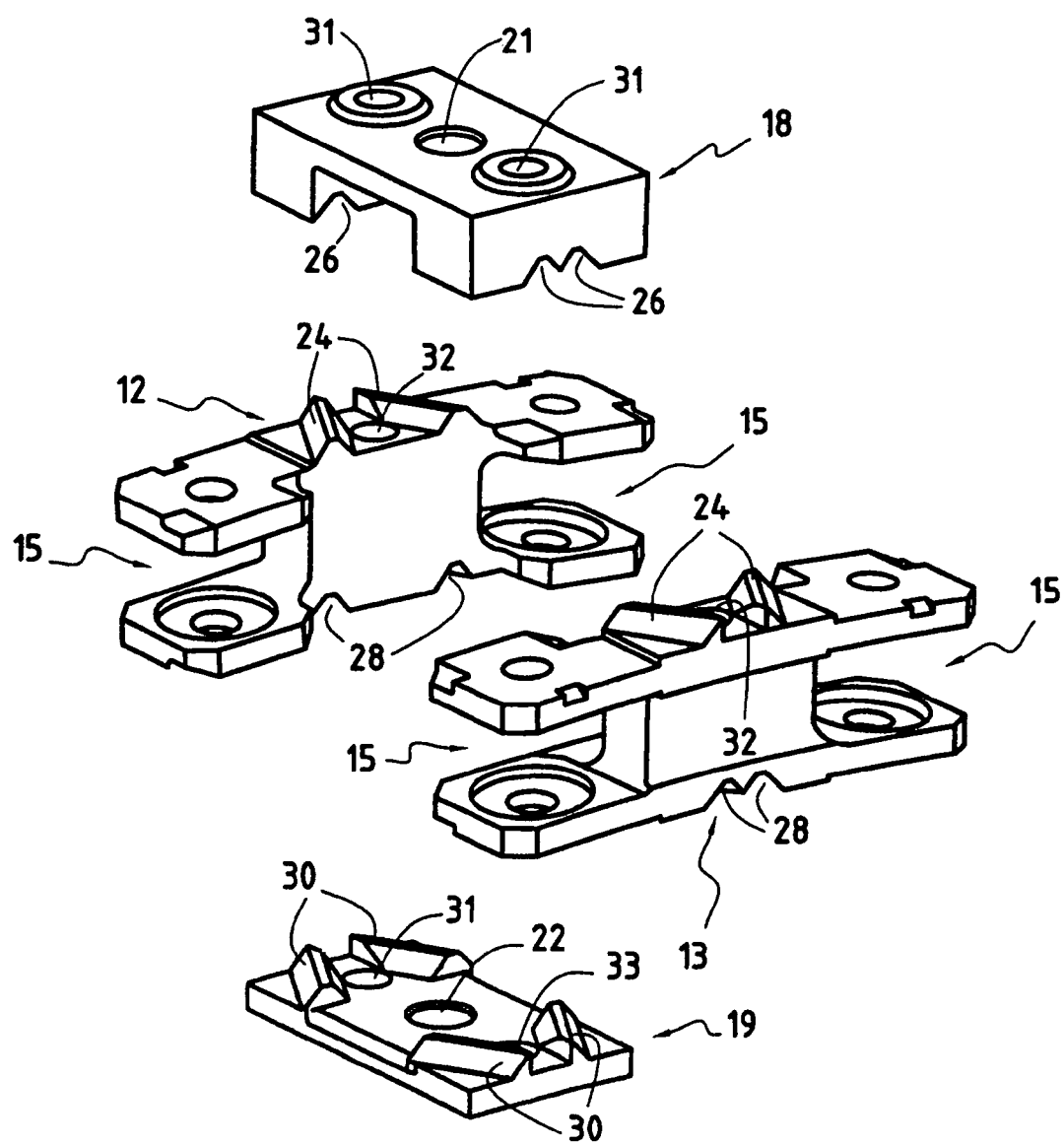
FIG. 1 shows a mechanical device of relatively complex shape made by assembling together four parts that are positioned relative to one another in accordance with the principle of the invention, the device being shown in an exploded perspective view.
Figure 2:
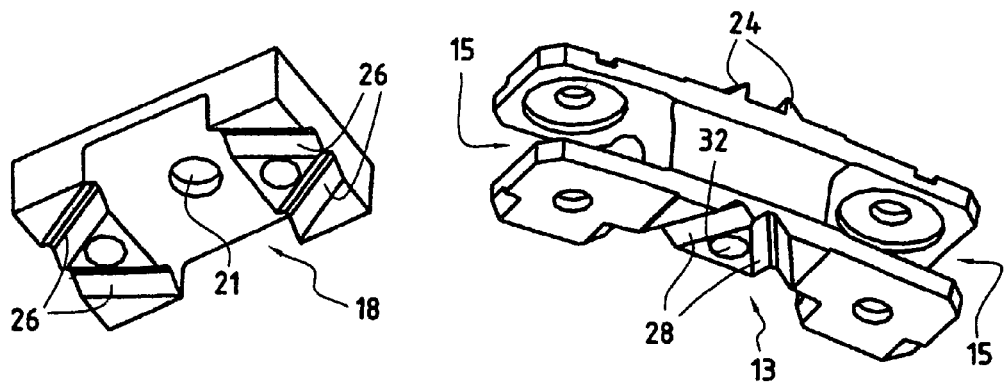
FIG. 2 shows two of the parts of FIG. 1 as seen from another angle in order to show other faces thereof.

The mechanical device shown in FIG. 1 is intended to constitute a piece of moving equipment carrying wheels and receiving a cylindrical shaft. The wheels and the shaft are not shown. The wheels are mounted in respective clevises. The shaft passes through the center of said moving equipment.

To make such a device, it is subdivided into four parts for assembling to one another by implementing positioning means in accordance with the principle of the invention. There can be seen two symmetrical longitudinal parts 12 and 13 each having two devises 15 for receiving respective wheels. In all, the device receives four wheels carried by the two longitudinal parts. They are held parallel to each other by two transverse parts 18, 19. The shapes and the dimensions of the transverse parts are such that after assembly the two longitudinal parts are held spaced apart from each other, thereby leaving space for passing the shaft which is held between two holes 21 and 22 each formed in the center of a respective one of the transverse parts.

In accordance with the invention, each transverse part 18, 19 is positioned relative to a longitudinal part 12, 13 by a system of grooves and ribs in a chevron configuration. Thus, the longitudinal part 12 includes on its top face (in the orientation shown in FIG. 1) two ribs 24 forming a chevron that co-operates with two grooves 26 forming a chevron of complementary shape and corresponding dimensions formed in the bottom face of the transverse part 18. Assembly is the same for the other longitudinal part 13 and the transverse part 18.

Furthermore, the bottom faces of the two longitudinal parts 12, 13 are provided with grooves 28 in a chevron configuration that co-operate with ribs 30 in a chevron configuration formed on the top face of the bottom transverse part.

Thus, on being assembled together, all of the parts become positioned relative to one another, merely by the ribs and the grooves in chevron configurations as described above engaging mutually. As shown, the ribs and the grooves are of V-section. In addition, the ribs and the grooves constituting any one chevron form between each other a predetermined angle that can be selected as a function of the shape of the parts to be assembled together. In practice, this angle preferably lies in the range 40° to 140°. An angle close to 90° is preferable, mechanically-speaking.

The four parts have holes 31, 32, and 33 extending between the chevrons. These holes move into alignment on assembly in order to define two passages for receiving bolts. Nevertheless, it is clear that the bolts do not contribute to the relative positioning of the parts, which relies entirely on the chevrons.

Figure 3:
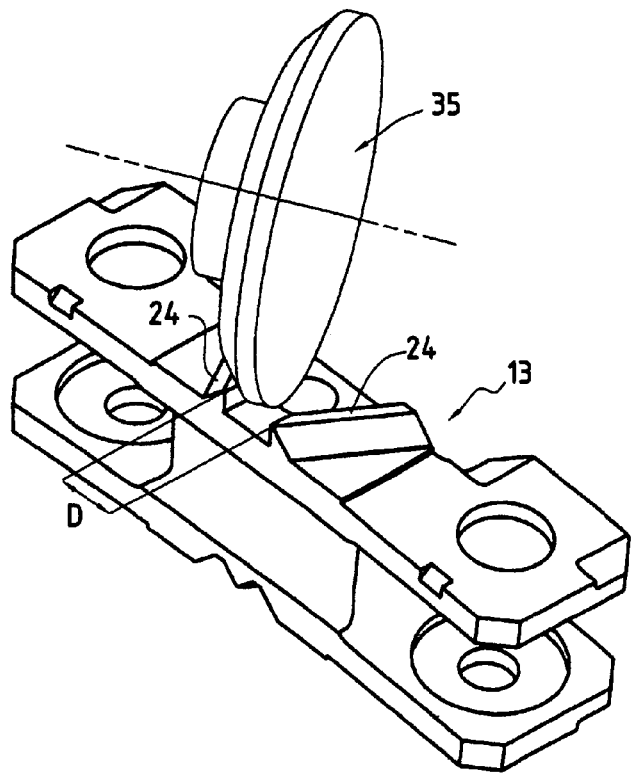
FIG. 3 shows a stage of machining one of the parts of FIG. 1.

As shown in FIG. 3, the closer-together ends of the ribs (or grooves) defining any one chevron are spaced apart by a distance D that is sufficient to leave room to pass a tool 35.

What is claimed is:

1. A mechanical device comprising:
    a first part including a first face having one of a set of two grooves in a chevron configuration or a set of two ribs in a chevron configuration;
    a second part including a first face having the one of the set of two grooves or the set of two ribs, wherein the first part and the second part are symmetrical with respect to each other; and
    a third part including a first planar face having a first set of the other one of the set of two grooves or the set of two ribs and a second set of the other one of the set of two grooves or the set of two ribs, wherein the one of the set of two grooves or the set of two ribs and the other one of the set of two grooves or the set of two ribs include complementary shapes and dimensions,
    wherein the first part, the second part and the third part are assembled together such that the first part and the second part are held spaced apart in a substantially parallel relationship by the third part, such that the one of the set of two grooves or the set of two ribs of the first part mutually engages the first set of the other one of the set of two grooves or the set of two ribs of the third part, and the one of the set of two grooves or the set of two ribs of the second part mutually engages the second set of the other one of the set of two grooves or the set of two ribs of the third part.

2. The mechanical device according to claim 1, further comprising a fourth part including a first face having a first set of the one of the set of two grooves or the set of two ribs and a second set of the one of the set of two grooves or the set of two ribs,
    wherein the first part includes a second face having the other one of the set of two grooves or the set of two ribs,
    wherein the second part includes a second face having the other one of the set of two grooves or the set of two ribs, and
    wherein the first part, the second part, the third part, and the fourth part are assembled together such that the first part and the second part are held spaced apart in a substantially parallel relationship by the third part and the fourth part, such that the other one of the set of two grooves or the set of two ribs of the first part mutually engages the first set of the one of the set of two grooves or the set of two ribs of the fourth part, and the other one of the set of two grooves or the set of two ribs of the second part mutually engages the second set of the one of the set of two grooves or the set of two ribs of the fourth part.

3. The device according to claim 2,
    wherein said first part includes a through hole that extends from a first opening located between the one of the set of two grooves or the set of two ribs on the first face of the first part to a second opening located between the other one of the set of two grooves or the set of two ribs on the second face of the first part,
    wherein said third part includes a first through hole that extends from a first opening located between the first set of the other one of the set of two grooves or the set of two ribs on the first face of the third part to a second opening located on a second face of the third part,
    wherein said fourth part includes a first through hole that extends from a first opening located between the first set of the one of the set of two grooves or the set of two ribs on the first face of the fourth part to a second opening located on a second face of the fourth part, and
    wherein the first through hole of the third part, the through hole of the first part, and the first through hole of the fourth part are aligned so as to define a first bolt receiving passage that extends from the second face of the third part to the second face of the fourth part when the first, second, third, and fourth parts are assembled together.

4. The device according to claim 3,
    wherein said second part includes a through hole that extends from a first opening located between the one of the set of two grooves or the set of two ribs on the first face of the second part to a second opening located between the other one of the set of two grooves or the set of two ribs on the second face of the second part,
    wherein said third part includes a second through hole that extends from a third opening located between the second set of the other one of the set of two grooves or the set of two ribs on the first face of the third part to a fourth opening located on the second face of the third part,
    wherein the fourth part includes a second through hole that extends from a third opening located between the second set of the one of the set of two grooves or the set of two ribs on the first face of the fourth part to a fourth opening located on the second face of the fourth part, and
    wherein the second through hole of the third part, the through hole of the second part, and the second through hole of the fourth part are aligned so as to define a second bolt receiving passage that extends from the second face of the third part to the second face of the fourth part when the first, second, third, and fourth parts are assembled together.

5. The device according to claim 4,
    wherein the third part includes a third through hole located between the first through hole of the third part and the second through hole of the third part,
    wherein the fourth part includes a third through hole located between the first through hole of the fourth part and the second through hole of the fourth part, and
    wherein the third through hole of the third part and the third through hole of the fourth part are aligned so as to define a cylindrical shaft receiving passage that extends from the second face of the third part to the second face of the fourth part when the first, second, third, and fourth parts are assembled together.

6. The mechanical device according to claim 1, wherein the one of the set of two grooves or the set of two ribs and the other one of the set of two grooves or the set of two ribs include a V-shaped cross-section.

7. The device according to claim 1, wherein the chevron configuration of the set of two grooves and the chevron configuration of the set of two ribs forms an angle of 40 ° to 1400 ° between the two grooves in the set of two grooves and between the two ribs in the set of two ribs.

8. The device according to claim 1, wherein each of the first and second parts include a first clevis and a second clevis positioned on opposite ends of the first and second parts.

9. A mechanical device comprising:
a first part including a first face having one of a set of two grooves or a set of two ribs in a chevron configuration, wherein the first part includes a through hole that extends from a first opening located between the one of the set of two grooves or the set of two ribs on the first face of the first part to a second opening located on a second face of the first part;
a second part including a first face having the one of the set of two grooves or the set of two ribs, wherein the second part includes a through hole that extends from a first opening located between the one of the set of two grooves or the set of two ribs on the first face of the second part to a second opening located on a second face of the second part, and wherein the first part and the second part are symmetrical with respect to each other; and
a third part including a first face having a first set of the other one of the set of two grooves or the set of two ribs and a second set of the other one of the set of two grooves or the set of two ribs, wherein said third part includes a first through hole that extends from a first opening located between the first set of the other one of the set of two grooves or the set of two ribs on the first face of the third part to a second opening located on a second face of the third part and a second through hole that extends from a third opening located between the second set of the other one of the set of two grooves or the set of two ribs on the first face of the third part to a fourth opening located on the second face of the third part, and wherein the one of the set of two grooves or the set of two ribs and the other one of the set of two grooves or the set of two ribs include complementary shapes and dimensions,
wherein the first part, the second part and the third part are assembled together such that the first through hole of the third part and the through hole of the first part are aligned so as to define a first bolt receiving passage that extends from the second face of the third part to the second face of the first part, such that the second through hole of the third part and the through hole of the second part are aligned so as to define a second bolt receiving passage that extends from the second face of the third part to the second face of the second part, such that the one of the set of two grooves or the set of two ribs of the first part mutually engages the first set of the other one of the set of two grooves or the set of two ribs of the third part, and the one of the set of two grooves or the set of two ribs of the second part mutually engages the second set of the other one of the set of two grooves or the set of two ribs of the third part.

10. The mechanical device according to claim 9, further comprising a fourth part including a first face having a first set of the one of the set of two grooves or the set of two ribs and a second set of the one of the set of two grooves or the set of two ribs,
wherein said fourth part includes a first through hole that extends from a first opening located between the first set of the one of the set of two grooves or the set of two ribs on the first face of the fourth part to a second opening located on a second face of the fourth part and a second through hole that extends from a third opening located between the second set of the one of the set of two grooves or the set of two ribs on the first face of the fourth part to a fourth opening located on the second face of the fourth part,
wherein the first part includes a second face having the other one of the set of two grooves or the set of two ribs,
wherein the second part includes a second face having the other one of the set of two grooves or the set of two ribs, and
wherein the first part, the second part, the third part, and the fourth part are assembled together such that the first through hole of the fourth part is aligned with the first through hole of the third part and the through hole of the first part so that the first bolt receiving passage extends from the second face of the third part to the second face of the fourth part, such that the second through hole of the fourth part is aligned with the second through hole of the third part and the through hole of the second part so that the second bolt receiving passage extends from the second face of the third part to the second face of the fourth part, such that the other one of the set of two grooves or the set of two ribs of the first part mutually engages the first set of the one of the set of two grooves or the set of two ribs of the fourth part, and the other one of the set of two grooves or the set of two ribs of the second part mutually engages the second set of the one of the set of two grooves or the set of two ribs of the fourth part.

11. The mechanical device according to claim 9, wherein the one of the set of two grooves or the set of two ribs and the other one of the set of two grooves or the set of two ribs include a V-shaped cross-section.

12. The device according to claim 9, wherein the chevron configuration of the set of two grooves and the chevron configuration of the set of two ribs forms an angle of 40° to 140° between the two grooves in the set of two grooves and between the two ribs in the set of two ribs.

13. The device according to claim 9, wherein each of the first and second parts include a first clevis and a second clevis positioned on opposite ends of the first and second parts.

14. A mechanical device comprising:
an assembly of a plurality of parts that are fastened to one another so as to be accurately positioned relative to one another, the plurality of parts including
two symmetrical longitudinal parts that are arranged in the assembly so as to extend in a longitudinal direction, and
two transverse parts that are arranged in the assembly so as to extend in a transverse direction,
wherein the two longitudinal parts are held spaced apart from each other in a substantially parallel relationship between the two transverse parts by a system of ribs and grooves in a chevron configuration, the system of ribs an grooves including
a set of ribs in a chevron configuration on a first face of each of the two longitudinal parts,
a set of grooves in a chevron configuration on a second face of each of the two longitudinal parts wherein the second face opposes in parallel with the first face of each of the longitudinal parts,
two sets of grooves in a chevron configuration on a face of a first one of the two transverse parts, and
two sets of ribs in a chevron configuration on a face of a second one of the two transverse parts,
wherein the set of ribs on the first face of a first one of the two longitudinal parts is mutually engaged with a first one of the two sets of grooves on the face of the first one of the two transverse parts, and the set of ribs on the first face of a second one of the two longitudinal parts is mutually engaged with a second one of the two sets of grooves on the face of the first one of the two transverse parts, and wherein the set of grooves on the second face of the first one of the two longitudinal parts is mutually engaged with a first one of the two sets of ribs on the face of the second one of the two transverse parts, and the set of grooves on the second face of the second one of the two longitudinal parts is mutually engaged with a second one of the two sets of ribs on the face of the second one of the two transverse parts.

* * * * *